US012050036B2

(12) United States Patent

Sun et al.

(10) Patent No.: US 12,050,036 B2
(45) Date of Patent: Jul. 30, 2024

(54) SYSTEM AND METHOD FOR COOLING POWER ELECTRONICS OF REFRIGERANT COMPRESSORS

(71) Applicant: DANFOSS A/S, Nordborg (DK)

(72) Inventors: Lin Xiang Sun, Tallahassee, FL (US); Tianlei Li, Tallahassee, FL (US); Brandon Keith Pritchard, Tallahassee, FL (US)

(73) Assignee: DANFOSS A/S, Nordborg (DK)

( * ) Notice: Subject to any disclaimer, the term of this patent is extended or adjusted under 35 U.S.C. 154(b) by 206 days.

(21) Appl. No.: 17/795,358

(22) PCT Filed: Mar. 16, 2021

(86) PCT No.: PCT/US2021/022462

§ 371 (c)(1),
(2) Date: Jul. 26, 2022

(87) PCT Pub. No.: WO2021/221806

PCT Pub. Date: Nov. 4, 2021

(65) Prior Publication Data

US 2023/0087561 A1 Mar. 23, 2023

Related U.S. Application Data

(60) Provisional application No. 63/017,796, filed on Apr. 30, 2020.

(51) Int. Cl.
*F25B 31/00* (2006.01)
*F04B 35/04* (2006.01)
(Continued)

(52) U.S. Cl.
CPC ............ *F25B 31/006* (2013.01); *F04B 35/04* (2013.01); *F04B 39/06* (2013.01); *F25B 1/053* (2013.01);
(Continued)

(58) Field of Classification Search
CPC ........... F25B 31/006; F25B 2700/2104; H02K 11/33; H02P 1/28; H02P 1/52; Y02B 30/70
See application file for complete search history.

(56) References Cited

U.S. PATENT DOCUMENTS 8,544,290 B2 10/2013 Norbeck
9,395,106 B2 * 7/2016 Voorhis ................ F25B 31/006
(Continued)

OTHER PUBLICATIONS

Inetnation Search Report and Written Opinion for PCT/U20S21/022462 dated Jun. 3, 2021.
Extended European Search Report for Application No. 21 27 5413 dated Apr. 8, 2024.

*Primary Examiner* — Lionel Nouketcha
(74) *Attorney, Agent, or Firm* — Carlson, Gaskey & Olds, P.C.

(57) ABSTRACT

This disclosure relates to refrigerant compressors, and, in particular, relates to cooling for the power electronics of such compressors. An example refrigerant system includes a main refrigerant loop in communication with a condenser, an evaporator, and a compressor. The refrigerant system further includes at least one cooling line configured to direct refrigerant from the main refrigerant loop to cool a chamber containing electronic components. A method is also disclosed.

15 Claims, 4 Drawing Sheets

(51) Int. Cl.

| | |
|---|---|
| ***F04B 39/06*** | (2006.01) |
| ***F25B 1/053*** | (2006.01) |
| ***F25B 1/10*** | (2006.01) |
| ***F25B 5/02*** | (2006.01) |
| ***F25B 41/20*** | (2021.01) |
| ***H02K 11/33*** | (2016.01) |
| ***H02P 1/28*** | (2006.01) |
| ***H02P 1/52*** | (2006.01) |

(52) U.S. Cl.
CPC .................. *F25B 1/10* (2013.01); *F25B 5/02* (2013.01); *F25B 41/20* (2021.01); *H02K 11/33* (2016.01); *H02P 1/28* (2013.01); *H02P 1/52* (2013.01); *F25B 2700/2104* (2013.01)

(56) References Cited

U.S. PATENT DOCUMENTS

| | | | | |
|---|---|---|---|---|
| 2003/0019235 | A1* | 1/2003 | Wall | F25B 49/027 257/E23.088 |
| 2005/0223730 | A1* | 10/2005 | Kester | F28D 1/0426 62/434 |
| 2007/0209378 | A1* | 9/2007 | Larson | B60H 1/3232 62/239 |
| 2009/0090113 | A1 | 4/2009 | Caillat | |
| 2014/0345311 | A1* | 11/2014 | Sun | F25B 40/02 62/259.2 |
| 2017/0131006 | A1 | 5/2017 | Thornton et al. | |
| 2019/0203992 | A1* | 7/2019 | Monteith | F25B 21/02 |

* cited by examiner

SYSTEM AND METHOD FOR COOLING POWER ELECTRONICS OF REFRIGERANT COMPRESSORS

RELATED APPLICATIONS

This application claims the benefit of U.S. Provisional Application No. 63/017,796, filed Apr. 30, 2020, the entirety of which is herein incorporated by reference.

TECHNICAL FIELD

This disclosure relates to refrigerant compressors, and, in particular, relates to cooling for the power electronics of such compressors.

BACKGROUND

Refrigerant compressors are used to circulate refrigerant in a chiller or heat pump via a refrigerant loop. In addition to the compressor, refrigerant loops are known to include a condenser, an expansion device, and an evaporator. Some compressors provide cooling to the motor and/or associated power electronics by conveying refrigerant from the main loop to the motor and/or the power electronics.

SUMMARY

A refrigerant system according to an exemplary aspect of the present disclosure includes, among other things, a main refrigerant loop in communication with a condenser, an evaporator, and a compressor. The refrigerant system further includes at least one cooling line configured to direct refrigerant from the main refrigerant loop to cool a chamber containing electronic components.

In a further embodiment, a soft start circuit is contained within the chamber.

In a further embodiment, the soft start circuit is configured to prevent a sudden current flow during the start of the compressor.

In a further embodiment, insulated-gate bipolar transistors (IGBTs) and a silicon-controlled rectifier (SCR) are also within the chamber.

In a further embodiment, a DC-to-DC converter is also within the chamber.

In a further embodiment, the soft start circuit is arranged vertically above, relative to a ground surface or surface upon which the compressor sits, the IGBTs.

In a further embodiment, the at least one cooling line includes a first cooling line configured to direct refrigerant to cool the IGBTs and the SCR.

In a further embodiment, the first cooling line includes an electromechanically operated valve selectively opened in response to instructions from a controller, and an orifice downstream of the electromechanically operated valve and upstream of both the IGBTs and the SCR.

In a further embodiment, the at least one cooling line includes a second cooling line configured to selectively direct refrigerant to cool a motor of the compressor.

In a further embodiment, the at least one cooling line includes a third cooling line configured to direct refrigerant to cool the soft start circuit, and the first, second, and third cooling lines split from a common source such that the first, second, and third cooling lines are arranged in parallel to one another.

In a further embodiment, the common source is the main refrigerant loop.

In a further embodiment, the third cooling line includes a thermal exchange unit.

In a further embodiment, the thermal exchange unit includes an evaporator adjacent a blower.

In a further embodiment, the thermal exchange unit includes one or both of fins and coils.

In a further embodiment, upstream of the thermal exchange unit, the third cooling line includes a flow regulator.

In a further embodiment, the flow regulator is an electronic expansion valve (EXV) selectively opened in response to instructions from the controller based on an output of a temperature sensor arranged in the chamber.

In a further embodiment, the flow regulator is a thermostatic expansion valve (TXV).

In a further embodiment, the flow regulator is provided by one of a fixed orifice or a capillary tube.

In a further embodiment, the refrigerant system is a heating, ventilation, and air conditioning (HVAC) chiller system.

A method according to an exemplary aspect of the present disclosure includes, among other things, directing refrigerant from a main refrigerant loop to cool a chamber of a refrigerant compressor, wherein the chamber contains electronic components including a soft start circuit configured to prevent a sudden current flow during the start of the refrigerant compressor.

DETAILED DESCRIPTION

Figure 1:
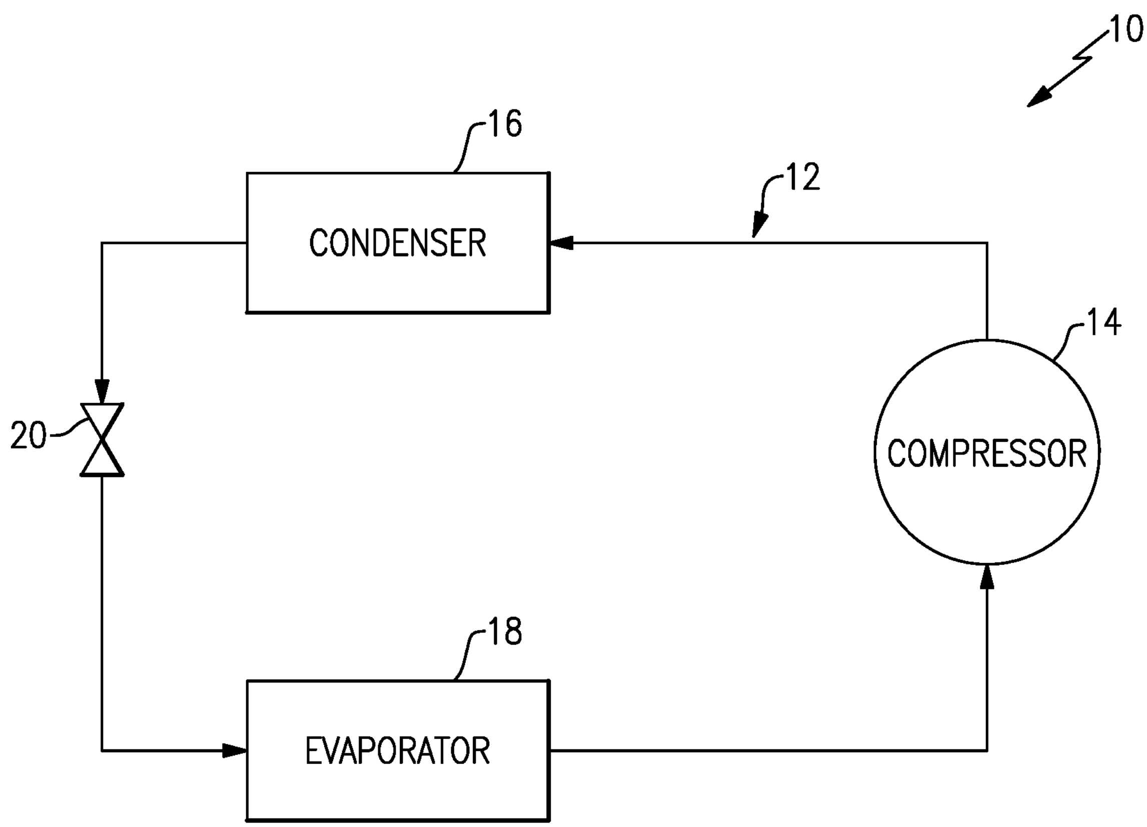
FIG. 1 schematically illustrates an example refrigerant loop.

FIG. 1 schematically illustrates a refrigerant cooling system 10. The refrigerant system 10 includes a main refrigerant loop, or circuit, 12 in communication with a compressor or multiple compressors 14, a condenser 16, an evaporator 18, and an expansion device 20. This refrigerant system 10 may be used in a chiller or heat pump, for example. While a particular example of the refrigerant system 10 is shown, this disclosure extends to other refrigerant system configurations. For instance, the main refrigerant loop 12 can include an economizer downstream of the condenser 16 and upstream of the expansion device 20. The refrigerant cooling system 10 may be an air conditioning system, for example.

Figure 2:
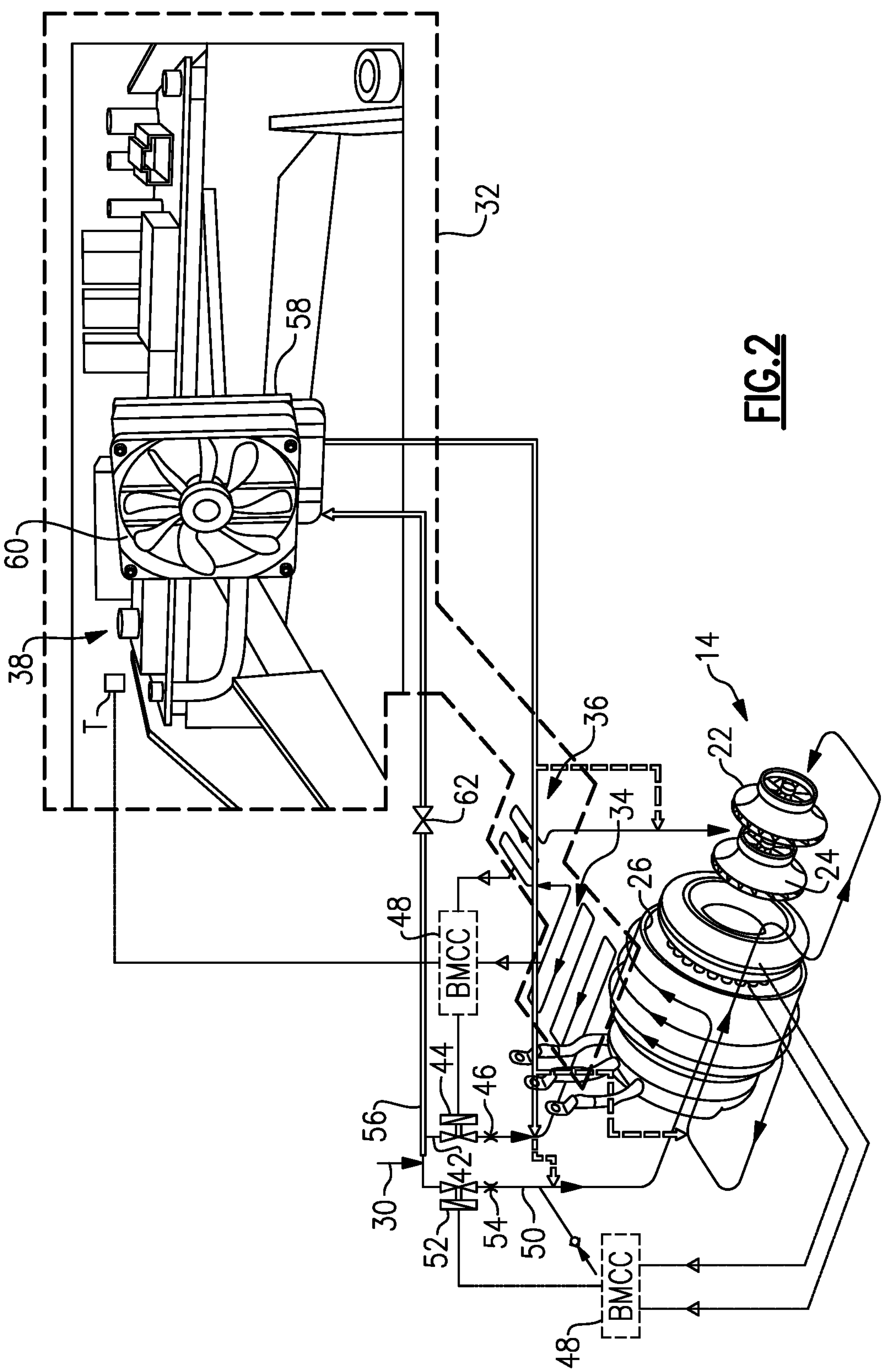
FIG. 2 schematically illustrates an example compressor cooling arrangement.

FIG. 2 schematically illustrates an example cooling arrangement for a compressor 14 and the associated power electronics. The example compressor 14 is a two-stage centrifugal compressor, including a first impeller 22 upstream of a second impeller 24. Other multiple-stage compressors may be utilized in other embodiments. Each impeller 22, 24 may include an impeller and shroud arrangement or another type of arrangement. The impellers 22, 24 are driven by a motor 26.

The compressor 14 may be cooled by a source of refrigerant 30 from the main refrigerant loop 12 (FIG. 1). The source of refrigerant 30, in this example, is configured to cool the motor 26 and the associated power electronics of the compressor 14. The power electronics are schematically illustrated at 32, and include insulated-gate bipolar transistors (IGBTs), and their associated driver and signal conditioning circuits 34, a silicon-controlled rectifier (SCR) 36, and a soft start circuit 38. The power electronics 32 may also include a DC-to-DC converter, among other possible electrical components. The soft start circuit 38 is configured to prevent a sudden current flow during the start of the compressor 14, and, in particular, is configured to slow down the rate of rising output voltage by minimizing the excess current flow during compressor start.

Figure 3:
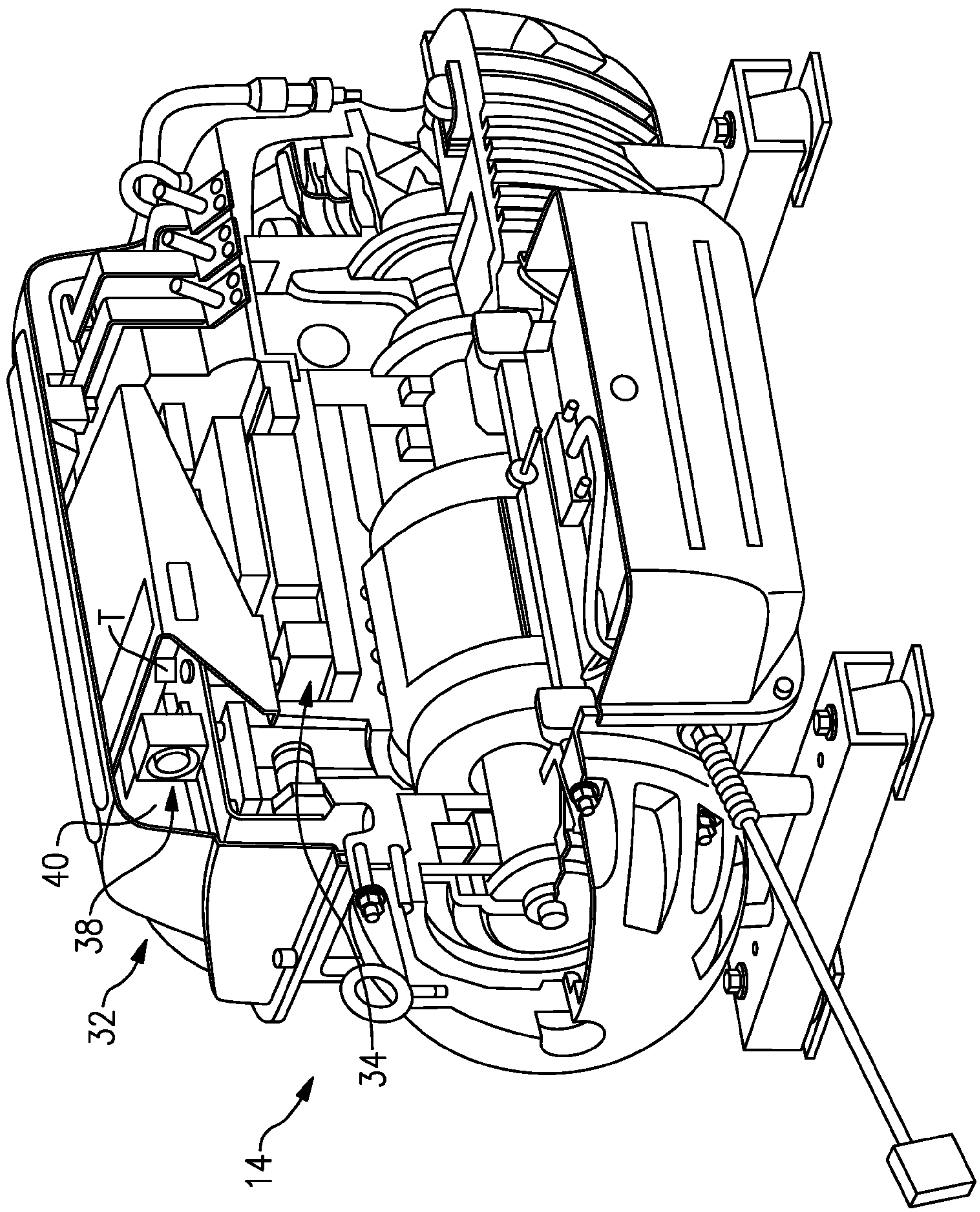
FIG. 3 is a partially sectioned view of an example compressor.
Figure 4:
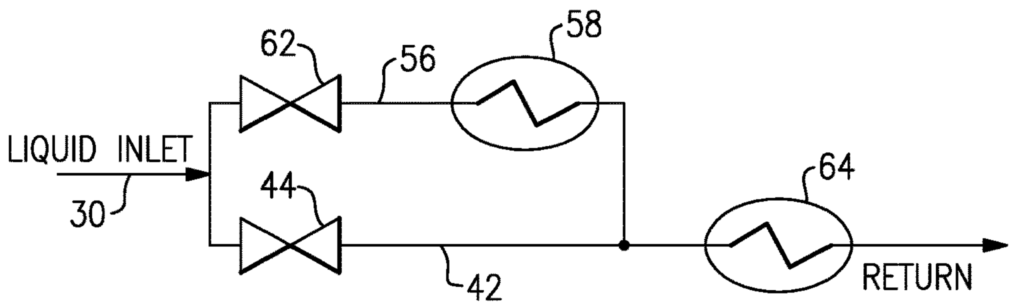
FIG. 4 schematically illustrates a first example arrangement of a cooling line for a soft start circuit.
Figure 5:
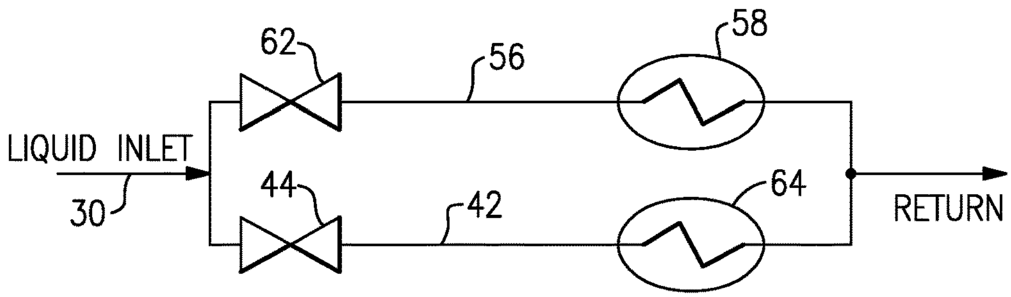
FIG. 5 schematically illustrates a second example arrangement of the cooling line for the soft start circuit.

With reference to FIG. 3, the soft start circuit 38 may be arranged vertically above, relative to a ground surface or surface upon which the compressor 14 sits, the IGBTs 34. The soft start circuit 38 may be arranged in a top portion of a chamber 40 containing the power electronics 32, which may be referred to as a top chamber. The chamber 40 is part of the compressor 14, in an example. This disclosure provides additional cooling to the top portion of the chamber 40, and in particular to the soft start circuit 38, relative to prior designs. The top portion of the chamber 40 may also include a driver and/or a signal conditioning circuit associated with the IGBTs 34, and may further include a DC-to-DC converter. In that case, this disclosure also provides additional cooling to those components.

With reference to FIG. 2, a first cooling line 42 draws cooling fluid from the main refrigerant loop 12 to cool the IGBTs 34 and SCR 36. The first cooling line 42 includes an electromechanically operated valve 44, such as a solenoid valve, and an orifice 46. The valve 44 may be selectively opened and closed in response to instructions from a controller 48. The valve 44 is upstream of the orifice 46, and the orifice 46 is upstream of both the IGBTs 34 and the SCR 36. Downstream of the IGBTs 34 and SCR 36, the first cooling line 42 is configured to return refrigerant to the main refrigerant loop 12 adjacent the inlet to the compressor 14.

The controller 48, illustrated schematically at two locations in FIG. 2, may be programmed with executable instructions for interfacing with and operating the various components of the compressor 14. The controller 48 is configured to receive information from the compressor 14 and is configured to interpret that information and issue commands to various components of the compressor 14. The controller 48 may include hardware and software. Further, the controller 48 may additionally include a processing unit and non-transitory memory for executing the various control strategies and modes of the compressor 14.

A second cooling line 50 is configured to selectively direct refrigerant from source 30 to cool the motor 26. The second cooling line 50 includes an electromechanically operated valve 52 selectively opened and closed in response to instruction from the controller 48. The second cooling line 50 also includes an orifice 54. The valve 52 is upstream of the orifice 54, and the orifice 54 is upstream of the motor 26. Downstream of the motor 26, the second cooling line 50 returns refrigerant to the main refrigerant loop 12 near the inlet to the compressor 14.

A third cooling line 56 is configured to direct refrigerant from source 30 to cool the soft start circuit 38 and/or the driver/signal conditioning circuit associated with the IGBTs 34 and/or the DC-to-DC converter. The third cooling line 56 includes a thermal exchange unit 58, which in one example is an evaporator, arranged adjacent a blower, or fan, 60. The thermal exchange unit 58 may include fins and/or coils. Heat is exchanged between the air blown over the thermal exchange unit 58 and the refrigerant within the thermal exchange unit 58 such that the air circulated inside of the top portion of the chamber 40 is substantially cool. As such, increased cooling of the electronics inside of the top portion of the chamber 40 is achieved.

Upstream of the thermal exchange unit 58, the third cooling line 56 includes a flow regulator 62. The flow regulator 62 may be an electronic expansion valve (EXV), thermostatic expansion valve (TXV), or a fixed orifice or capillary tube.

In the example where the flow regulator 62 is an EXV, the temperature of the top chamber (i.e., the portion of chamber 40 adjacent the soft start circuit 38 and above the IGBTs 34) can be actively controlled. In particular, a temperature sensor T (FIGS. 2 and 3) is located adjacent the top chamber and is configured to generate a signal which can be interpreted by the controller 48 as a temperature of the top portion of the chamber 40. The controller 48 can use the signal from the temperature sensor T to adjust a position of the EXV in real time to regulate the temperature of the soft start circuit 38.

In the example where the flow regulator 62 is a TXV, the temperature of the top chamber can also be actively controlled using the TXV. In that example, active control of the temperature is achieved within the TXV itself by a preset value without the controller 48.

Alternatively, for a lower cost option, flow through the third cooling line 56 is passively controlled when the flow regulator 62 is a fixed orifice or capillary tube. In this example, there is no temperature sensor T.

In another example, the thermal exchange unit 58 is mounted directly on part of the main housing of the compressor 14. The main housing provides a cold sink to absorb the heat in the top cover chamber. In this option, there is no coolant flow to the thermal exchange unit 58.

Downstream of the thermal exchange unit 58, the third cooling line 56 returns refrigerant to the main refrigerant loop 12 at a low pressure location. Example locations include a suction return, a location along the first cooling line 42 downstream of the SCR 36, a location along the second cooling line 50 downstream of the orifice 54 and upstream or downstream of the motor 26, or an inter-stage return, as examples.

Figure 6:
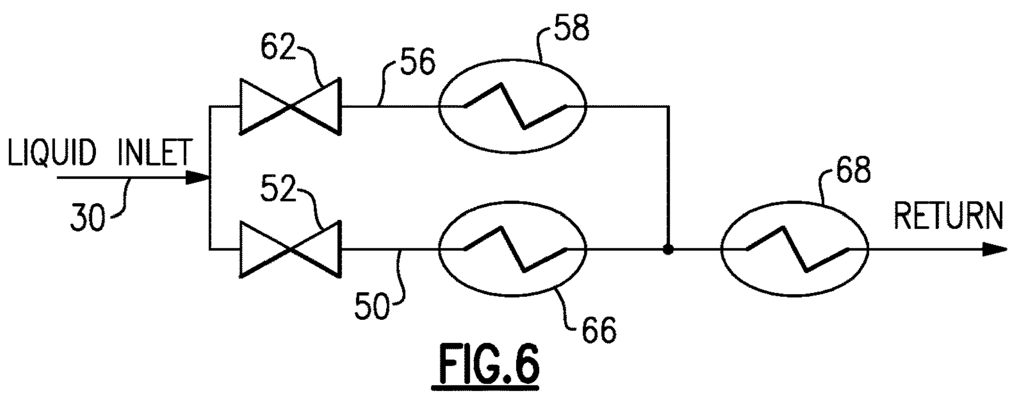
FIG. 6 schematically illustrates a third example arrangement of the cooling line for the soft start circuit.
Figure 7:
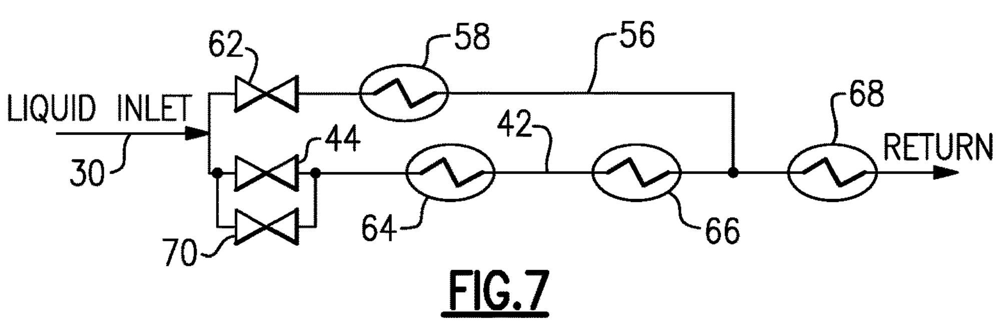
FIG. 7 schematically illustrates a fourth example arrangement of the cooling

Additional examples include along the first cooling line 42 at a location upstream of an IGBT thermal exchange unit 64 (FIG. 4), along the first cooling line 42 at a location downstream of an IGBT thermal exchange unit 64 (FIG. 5), or along the second cooling line 50 downstream of a motor cooling circuit 66 and upstream of a bearing/rotor cooling circuit 68 (FIG. 6). In another example arrangement, which is shown in FIG. 7, the first cooling line 42 includes the IGBT thermal exchange unit 64 upstream of the motor cooling circuit 66. In that example, the third cooling line 56 merges with the first cooling line 42 at a location downstream of the motor cooling circuit 66 and upstream of the bearing/rotor cooling circuit 68. Further, in this example, because valve 44 is associated with fixed orifice 46, an electromechanical valve 70 is arranged in parallel to the valve 44 and orifice 46 (FIG. 2). The valve 70 can be opened to permit flow to bypass the valve 44 and orifice 46, thereby permitting additional flow to enter into the system, which is useful in conditions when there is relatively low flow through the valve 44 and orifice 46. Each option may have benefits, such as ease of integration, and/or challenges, such as flow matching, depending on the particular application. Further, FIGS. 4-7 are highly schematic and only certain components are illustrated. As examples, the orifices 46, 54 associated with valves 42, 52 are not illustrated in FIGS. 4-7 but are present and arranged substantially as in FIG. 2.

It should be understood that directional terms such as "upper" and "top" are used above with reference to the normal operational attitude of the compressor 14 relative to a surface upon which the compressor 14 is mounted (i.e., a ground or floor surface). Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A refrigerant system, comprising:

a main refrigerant loop in communication with a condenser, an evaporator, and a compressor; and at least one cooling line configured to direct refrigerant from the main refrigerant loop to cool a chamber containing electronic components, wherein a soft start circuit is contained within the chamber, wherein insulated-gate bipolar transistors (IGBTs) and a silicon-controlled rectifier (SCR) are also within the chamber, wherein the soft start circuit is arranged vertically above, relative to a ground surface or surface upon which the compressor sits, the IGBTs, wherein the at least one cooling line includes a first cooling line configured to direct refrigerant to cool the IGBTs and the SCR, and wherein a second cooling line is configured to selectively direct refrigerant to cool a motor of the compressor.

2. The refrigerant system as recited in claim 1, wherein the soft start circuit is configured to prevent a sudden current flow during the start of the compressor.

3. The refrigerant system as recited in claim 1, wherein a DC-to-DC converter is also within the chamber.

4. The refrigerant system as recited in claim 1, wherein:

the at least one cooling line includes a third cooling line configured to direct refrigerant to cool the soft start circuit, and the first, second, and third cooling lines split from a common source such that the first, second, and third cooling lines are arranged in parallel to one another.

5. The refrigerant system as recited in claim 4, wherein the common source is the main refrigerant loop.

6. The refrigerant system as recited in claim 4, wherein the third cooling line includes a thermal exchange unit.

7. The refrigerant system as recited in claim 6, wherein the thermal exchange unit includes an evaporator adjacent a blower.

8. The refrigerant system as recited in claim 6, wherein the thermal exchange unit includes one or both of fins and coils.

9. The refrigerant system as recited in claim 6, wherein, upstream of the thermal exchange unit, the third cooling line includes a flow regulator.

10. The refrigerant system as recited in claim 9, wherein the flow regulator is an electronic expansion valve (EXV) selectively opened in response to instructions from a controller based on an output of a temperature sensor arranged in the chamber.

11. The refrigerant system as recited in claim 9, wherein the flow regulator is a thermostatic expansion valve (TXV).

12. The refrigerant system as recited in claim 9, wherein the flow regulator is provided by one of a fixed orifice or a capillary tube.

13. The refrigerant system as recited in claim 1, wherein the refrigerant system is a heating, ventilation, and air conditioning (HVAC) chiller system.

14. A refrigerant system, comprising:

a main refrigerant loop in communication with a condenser, an evaporator, and a compressor; and at least one cooling line configured to direct refrigerant from the main refrigerant loop to cool a chamber containing electronic components, wherein a soft start circuit is contained within the chamber, wherein insulated-gate bipolar transistors (IGBTs) and a silicon-controlled rectifier (SCR) are also within the chamber, wherein the soft start circuit is arranged vertically above, relative to a ground surface or surface upon which the compressor sits, the IGBTs, wherein the at least one cooling line includes a first cooling line configured to direct refrigerant to cool the IGBTs and the SCR, and wherein the first cooling line includes an electromechanically operated valve selectively opened in response to instructions from a controller, and an orifice downstream of the electromechanically operated valve and upstream of both the IGBTs and the SCR.

15. A method, comprising:

directing refrigerant from a main refrigerant loop to cool a chamber of a refrigerant compressor, wherein the chamber contains electronic components including a soft start circuit configured to prevent a sudden current flow during the start of the refrigerant compressor, wherein insulated-gate bipolar transistors (IGBTs) and a silicon-controlled rectifier (SCR) are also within the chamber, wherein the soft start circuit is arranged vertically above, relative to a ground surface or surface upon which the compressor sits, the IGBTs, wherein a first cooling line is configured to direct refrigerant to cool the IGBTs and the SCR, and wherein a second cooling line is configured to selectively direct refrigerant to cool a motor of the compressor.

* * * * *